United States Patent [19]

Showell

[11] 3,890,903

[45] June 24, 1975

[54] STORAGE ASSEMBLIES

[75] Inventor: Richard G. D. Showell, Bishampton, near Pershore, England

[73] Assignee: Bar Productions (Bromsgrove) Limited, Bomsgrove, England

[22] Filed: Nov. 30, 1973

[21] Appl. No.: 420,694

[30] Foreign Application Priority Data

Aug. 4, 1973 United Kingdom .............. 37102/73

[52] U.S. Cl. .......... 104/1 R; 214/16.1 CC; 214/44; 312/198; 318/264

[51] Int. Cl. ............................................ A47b 53/00

[58] Field of Search .......................... 312/198–201; 104/1 R; 318/264; 214/16.1 CC, 44

[56] References Cited

UNITED STATES PATENTS

| | | | |
|---|---|---|---|
| 2,386,487 | 10/1945 | Manney et al. | 318/264 |
| 2,605,911 | 8/1952 | Medway | 214/16.1 CC |
| 2,617,546 | 11/1952 | Rosener | 214/44 |
| 3,640,595 | 2/1972 | Staller et al. | 312/198 |

*Primary Examiner*—Robert S. Ward, Jr.
*Assistant Examiner*—Reinhard J. Eisenzopf
*Attorney, Agent, or Firm*—Scrivener Parker Scrivener and Clarke

[57] ABSTRACT

Storage assemblies in which a row of storage members, such as racks, are movable along the length of the row in either of two opposite directions so that a gangway can be provided between any two adjacent members.

14 Claims, 3 Drawing Figures

| | GANGWAY | | | |
|---|---|---|---|---|
| | G1 | G2 | G3 | G4 |
| SS1-2 | X | | | |
| SS1-3 | | X | X | X |
| SS1-4 | X | X | | |
| SS1-5 | | | X | X |
| SS1-6 | X | X | X | |
| SS1-7 | | | | X |

STORAGE ASSEMBLIES

Each storage member has two sensor switches mounted on it, each of which is operated through a corresponding elongate feeler bar towards the bottom thereof which extends substantially the full width of the storage member and which co-operates with the neighbouring storage member on one side or the other of said storage member so that one sensor switch is operated only when the storage member has closed onto a storage member on one side of it and the other sensor switch is operated only when the storage member has closed onto a storage member on the other side of it, and each of the sensor switches being connected in a corresponding control circuit with drive means for the storage member and with an individual selector switch of a central gangway selector programmer.

This invention relates to storage assemblies of the kind in which a row of storage members, such as racks, are movable along the length of the row in either of two opposite directions so that a gangway can be provided between any two adjacent members.

The present invention consists in a storage assembly of the aforesaid kind and further comprising two sensor switches mounted on each storage member and operated through corresponding elongate feeler bars which are mounted towards the bottom of each storage member on both sides and extend substantially the full width of the storage member so as to cooperate with the neighbouring storage member on one side or the other of said storage member so that one sensor switch is operated only when the storage member has closed onto a storage member on one side of it and the other sensor switch is operated only when the storage member has closed onto a storage member on the other side of it; a central programmer including a plurality of selector switches and manually operable means which control operation of the selector switches in a predetermined manner for selection of the different gangways; and a plurality of control circuits each of which includes a selector switch and a sensor switch and controls operation of drive means which is associated with the same storage member as the sensor switch and which operates to drive said storage member in a direction which results in operation of the sensor switch through the associated feeler bar, each control circuit being such that the drive means is operated only when the selector switch is operated and the sensor switch is not operated.

When the storage assembly according to the invention assumes a stationary state, only the two sensor switches which are associated with the storage members on each side of the gangway and which are further associated with the drive means that drives these storage members towards the gangway, are inoperative. Thus, selection of a new gangway on the programmer can initially only cause movement of one or the other of these two storage members into the existing gangway. However, movement of one of these two storage members disengages the feeler bar on the next adjacent storage member and renders the associated sensor switch inoperative so that the associated drive means which is operative to drive said next adjacent storage member in the same direction as the first moving storage member, can be activated. Whether or not the drive means is actuated depends on whether or not the programmer has operated the associated selector switch. The programmer operates one of the two selector switches associated with each storage member so that one of the two control circuits is set-up to move the storage member in an appropriate direction, but depending on the position of the existing gangway and the resulting state of the sensor switches, only some of these set-up circuits actually become effective to move the storage members and give the newly selected gangway. The movement of each storage member is terminated when it closes on the neighbouring storage member and the feeler bar on its leading side is engaged and operates the associated sensor switch to stop the drive means.

Besides controlling movement of the storage members by sensing the presence of an adjacent storage member as described above, the feeler bars serve to sense the presence of any obstructions in the paths of the storage members, a feeler bar engaging any obstruction before it and operating the associated sensor switch to stop the storage member. Once the storage member has been stopped by an obstruction, any storage member following it will then close on the first storage member and will be stopped by operation of the feeler bar on its leading side. In this way, several storage members can be brought safely to a stop one after the other. The feeler bars therefore render the storage assembly inherently safe in its design and there is no need to provide a separate means for detecting obstructions in the paths of the storage members or to prevent access between the storage members while they are moving.

Preferably, the control circuits are adapted so that once the storage members have stopped through operation of the feeler bars, they cannot move again unless the programmer is newly operated. This prevents any risk of injury to personnel when removing an obstructions from the front of an arrested storage member.

In a simple embodiment of the invention, each control circuit is a series circuit which includes the sensor switch and selector switch and drive switch means, such as a relay, which controls power circuits to a set of reversible motors mounted on the associated storage member to drive it. The sensor switch is open when it is operated by the associated feeler bar engaging the adjacent storage member but closes when the feeler bar disengages the adjacent storage member. The selector switch is closed when it is operated by the programmer and if the sensor switch is also closed at this time, the relay is energised and switches power to the motors so that they are actuated. The relay switch contacts are arranged so that the motors rotate in one sense to drive the storage member in the direction towards said adjacent storage member from which the feeler means is disengaged. Further, the relays in each of the two control circuits associated with a storage member control the supply of power to the same set of reversible motors, but each relay when energised supplies power to the motors so that they rotate in an opposite sense to that when they are powered through energisation of the other relay.

In this simple embodiment, when two or more neighbouring storage members move one after the other in the same direction to provide a new gangway, there is only a small spacing between the moving storage members because each begins to move as soon as the associated feeler bar which had been engaging the preceding storage member, is released through movement of the latter. Such small spacing can cause difficulties in that the loading of the storage members may cause them to travel at slightly different speeds whereupon one storage member may catch up sufficiently with the one ahead of it for its associated bar to re-engage that storage member and cause it to stop. This may occur repeatedly thus causing one or more of the storage members to move erratically in a series of short steps rather than in a single continuous movement, or may stop the whole selection process before it is completed.

The above described difficulties arising in the simple embodiment of the invention are overcome according to a further feature of the invention by providing a timer in each control circuit which introduces a predetermined time delay between operation of the sensor switch and operation of the drive means, which time delay is such that it is not possible to successive moving storage members to catch up with one another.

The invention is now described by way of example with reference to the accompanying drawings in which.

Figures 1, 3:
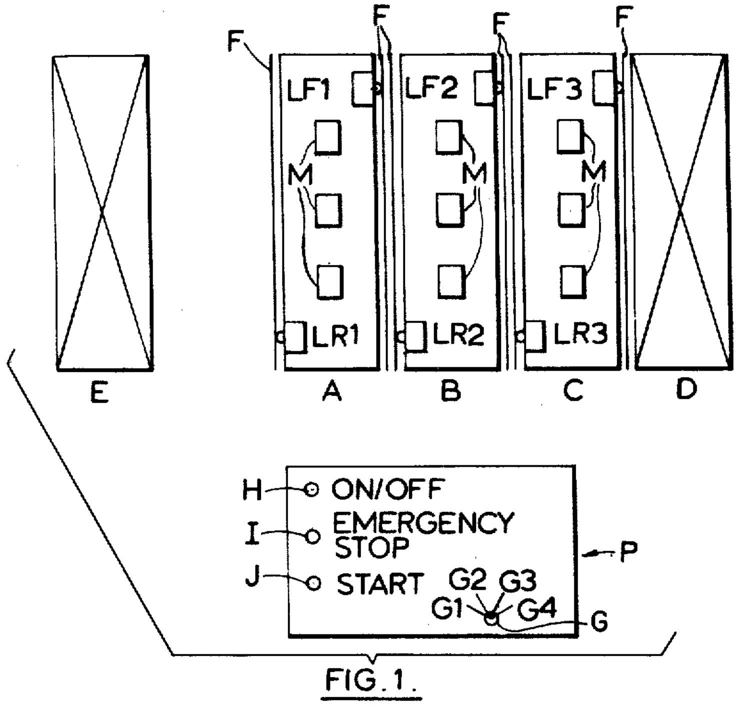
FIG. 1 is a schematic plan view of a storage assembly according to the invention.
FIG. 3 is a table which shows the predetermined manner in which the selector switches of the central programmer operate.

The storage members of the assembly comprise two fixed end racks D, E and three intermediate movable racks A, B, C which are guided so as to provide any one of four possible gangways G1 to G4 between the racks. A set of reversible motors M are mounted on each of the racks A, B, C and drive one or more ground engaging wheels to move the rack. Further, two sensor switches, LR, LF are mounted one on each side of each of the movable racks A, B, C, and each is operated through a feeler bar F which extends across the rack and protrudes from it so as to co-operate with the base of the neighbouring rack opposite the sensor switch. Each sensor switch is connected in an individual control circuit (shown bracketed in FIG. 2) which controls operation of the set of motors M on the same rack as the sensor switch, the control circuit serving to operate the motors so that they rotate in one particular sense to move the rack in the particular direction indicated by the arrow alongside the circuit in FIG. 2. These arrows can be related to the racks shown in FIG. 1 and it will be seen that each control circuit operates the motors so as to move the rack in a direction towards that side of the rack on which the sensor switch is mounted. For example, the control circuit including the sensor switch LF1 operates to move the rack A to the right in FIG. 1, the sensor switch LF1 being mounted on the right-hand side of the rack A.

Each sensor switch is a double pole switch and its switch contacts assume the positions shown for switch LR1 when the associated feeler bar F does not engage the base of the adjacent rack, and its switch contacts assume the positions shown for all of the other switches LR, LF when the associated feeler bar engages the base of the adjacent rack. One switch contact of each sensor switch is connected in a series circuit with an individual selector switch SS1–2 to SS1–7 of a central programmer P and an individual timer T4 to T9. Each timer T4 to T9 controls a similarly referenced switch which is connected in series with a relay MF1 to 3, MR1 to 3 across the sensor switch and timer. Each relay controls the supply of power to the set of motors M on the associated rack A, B, C. The other switch contact of each sensor switch assumes the opposite state to the first switch contact and is connected in series with a stop relay R23 to 28 across the relay MR, MF. When the stop relay is energized one of its switch contacts in series with the relay MR, MF is opened to de-energise the latter.

The central programmer P comprises manually operable gangway selection means G which controls all of the selector switches SS1–1 to SS1–7 in a predetermined manner. The selection means G shown in FIG. 1 takes the form of a rotary switch with angular settings each corresponding to an individual gangway but it may also take the form of an array of buttons or switches each corresponding to an individual gangway. Selection of each gangway by the selection means operates the selector switches SS1–1 to SS1–7 as shown in the programme diagram of FIG. 3. A cross in this diagram indicates that the corresponding selector switch is closed. The central programmer P also comprises a master key switch H and emergency stop switch I which control the supply of power to the control circuitry, and a section start switch or button J which has to be operated after a selection has been registered so as to initiate movement of the racks. The central programmer may be positioned in a storage area or gangway or even on one of the racks.

Figure 2:
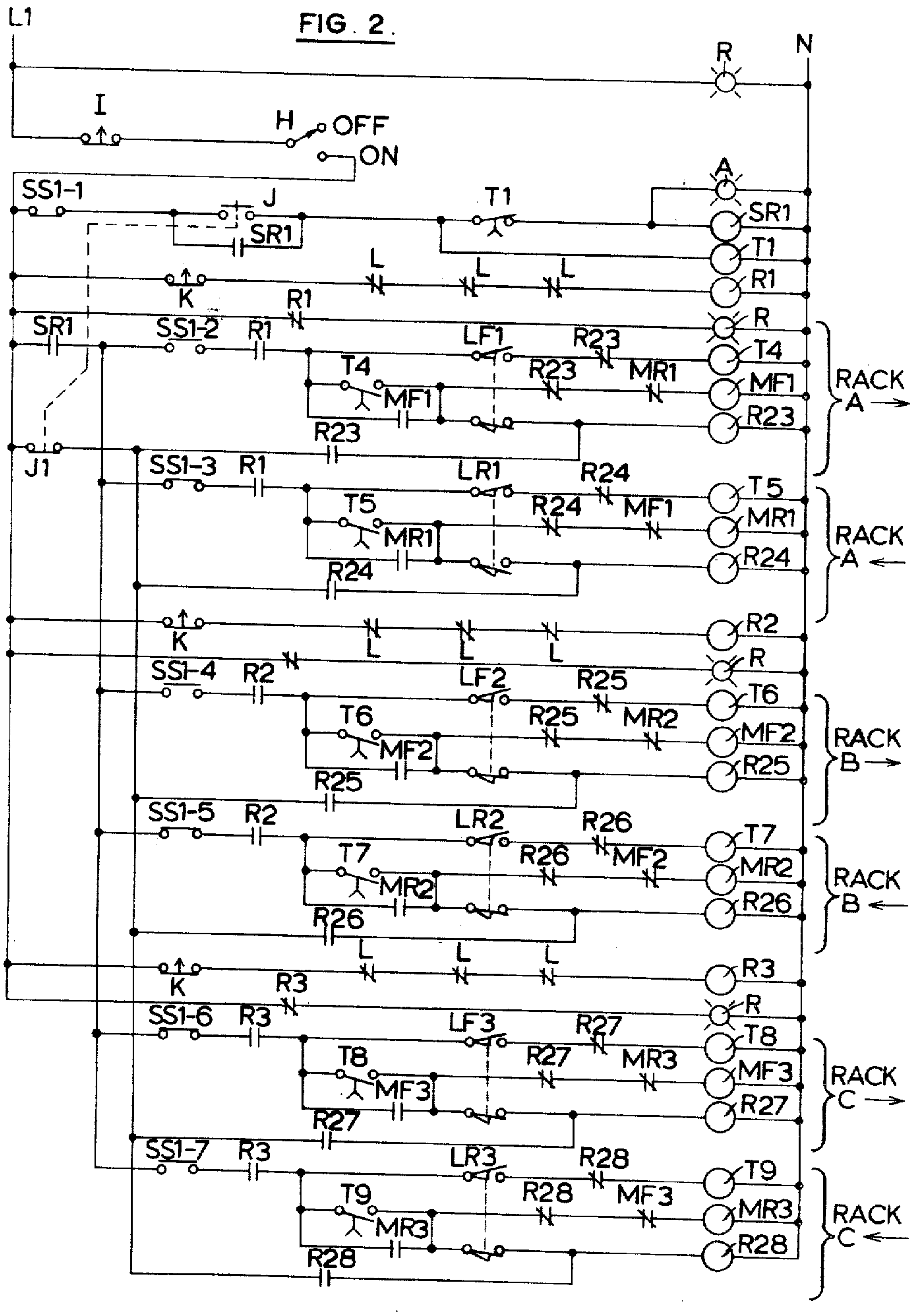
FIG. 2 is a circuit diagram of the storage assembly of FIG. 1.

In FIG. 2 the selector switches are shown in their positions following selection of a new gangway G3. To effect this selection the section start button J is depressed and, assuming the master key switch M has been closed, this energises the start relay SR1 and timer T1. The start relay then holds itself energised via a switch constant SR1 connected across the section start switch J and closes another switch contact SR1 to connect power through to all of the selector switches SS1–2 to SS1–7. The selector switches SS1–3, SS1–5 and SS1–6 are closed, and provided the emergency stop relays R1, R2 and R3 are energised, power is connected through them to the corresponding sensor switches LR1, LR2 and LF3. Only the sensor switch LR1 is in its inoperative state with the first switch contact closed and this causes the timer T5 to be actuated. After a preset time determined by the timer T5, the latter operates to close its switch T5 which action energises the relay MR1 and causes it to operate the motors M on rack A and move it to the left. At the same time, relay MR1 closes the switch contact MR1 across the timer switch T5 to hold itself energised, and opens the switch contact MR1 in series with the relay MF1 in the other control circuit associated with rack A so as to prevent operation of the motors M in the opposite sense.

Once rack A begins to move to the left it disengages the feeler bar F of the sensor switch LR2 on rack B and the switch LR2 changes to its inoperative state in which it completes a circuit through selector switch SS1–5 to the timer T7. The timer T7 operates and closes its switch T7 after a predetermined time, thereby energising the relay MR2 and causing movement of rack B to the left. The delay introduced by the timer T7 produces a spacing between the moving racks A and B such that rack B cannot catch up with rack A. Typically, the time delay introduced by each of the timers T4 to T9 would be half a second.

Once rack B begins to move to the left it disengages the feeler bar F of the sensor switch LR3 on rack C and the switch LR3 changes to its inoperative state. However, the selector switch SS1–7 in the control circuit with the sensor switch LR3 is open and the timer T9 and relay MR3 cannot be operated to move rack C to the left.

The rack A comes to a stop when the feeler bar F on its left hand side engages the left hand fixed rack E and operates the sensor switch LR1. The second switch contact of LR1 then closes and completes a circuit through switch contact MR1 to energise the stop relay R24. The energised relay R24 opens the switch contact R24 in series with the relay MR1 and thereby de-energises the latter to stop the motors M on rack A. The relay R24 also opens a switch contact R24 in series with the timer to stop that from operating. The rack B is similarly stopped when the sensor switch LR2 is operated through co-operation of its left hand feeler bar F with the rack A, the stop relay R26 then being energised.

According to an important subsidiary feature of the invention, each of the stop relays R23 to 28 are connected to a self-holding circuit including one of their switch contacts and a switch J1 which is ganged with the section start switch J and is normally closed. For example, when the stop relay R24 is energised it closes its switch contact R24 and thereby holds itself energised until the section start switch J is depressed again. Because of this feature a rack is brought to a stop if the leading feeler bar F on the rack engages an obstruction while it is moving, and the rack will not begin to move again if the obstruction is removed. To start the rack again the section start switch J has to be operated, which action interrupts all of the self-holding circuits and de-energises any stop relay which is energised.

The timer T1 performs an overall timing function for each gangway selection operation by opening the switch T1 after a predetermined time so as to de-energise the start relay SR1 and interrupt the power supply to the selector switches SS1–2 to SS1–7. This predetermined time is just sufficient to allow all of the possible selection operations under normal conditions so that the timer T1 will only interrupt a selection operation if it is not being carried out correctly.

A further important subsidiary feature of the invention consists in arranging that the selector switch SS1–1 in series with the section start switch J and start relay SR1 so that each selection operation momentarily opens and closes the switch SS1–1, thereby de-energising the start relay SR1. This feature ensures that a selection process is brought to a stop if during that process an attempt is made to select a new gangway. The selection process can only be started again by operation of the section start switch J.

A separate emergency stop or overload circuit is provided for each of the movable racks A, B, C comprising an emergency stop switch K and three overload switches L which are connected in series with a respective relay R1, R2 or R3. Switch contacts R1, R2, R3 of each relay are connected in series with the selector switches in the associated control circuits and in series with a warning lamp R so that when an emergency stop switch K, or overload switch L is operated the associated relay operates and prevents or stops movement of the associated rack.

In an alternative simpler embodiment of the invention, the timers T4 to T9 could be omitted from the control circuits and the relays MF1 to 3 and MR1 to 3 could be connected in place of the timers so that in each control circuit the selector switch, sensor switch and relay are connected in series. In this embodiment, when two or more neighbouring racks move one after the other in the same direction to provide a new gangway, there is only a small spacing between the moving racks because each begins to move as soon as the associated feeler bar F which has been engaging the preceding rack, is released through movement of the latter. Stopping of the racks occurs as in the illustrated embodiment when the inoperative sensor switch on the moving rack is operated through engagement of its feeler bar F with a neighbouring rack, the associated stop relay R23 to 28 then being energised and opening a switch to de-energise the relay MF, MR.

It will be appreciated that although the invention has been described with reference to a storage assembly comprising three movable racks, the invention can be applied to a system having any number of racks or similar storage members.

I claim:

1. A storage assembly comprising a row of storage members which are movable along the length of the row in either of two opposite directions so that a gangway can be provided between any two neighbouring storage members; drive means associated with each storage member which serves to move it along the length of the row; two drive switch means associated with each storage member which each control the drive means associated with said storage member and operate to cause the latter to be driven in a different direction along the length of the row; separate elongate feeler bars mounted on both sides of each storage member towards the bottom thereof so that each extend substantially the full width of the storage member and is operated by the neighbouring storage member opposite when said storage member on which it is mounted has closed onto said neighbouring storage member; two sensor switches mounted on each storage member which are each operated by a respective one of said feeler bars when the latter is operated; a central programmer including a plurality of selector switches and manually operable means which control operation of the selector switches in a predetermined manner for selection of the different gangways; and a plurality of control circuits each of which includes a selector switch, a sensor switch and one of said drive switch means which is associated with the same storage member as the sensor switch and which operates to cause the associated drive means to drive said storage member in a direction which results in operation of the sensor switch through the associated feeler bar, said drive switch means being operative only when the selector switch is operated and the sensor switch is not operated.

2. An assembly as claimed in claim 1 in which the drive means comprises at least one reversible electric motor mounted on each storage member, and in which the two drive switch means associated with each storage member control the power supply to the motor so that the polarity of the applied power is different in each case.

3. An assembly as claimed in claim 2 in which the drive switch means are relays and each control circuit is a series circuit which includes a selector switch which is closed when operated by the central programmer, a sensor switch which is closed when not operated by the associated feeler bar and a drive relay.

4. An assembly as claimed in claim 1 in which each control circuit includes a timer which introduces a predetermined delay between the time when a sensor switch assumes its non-operated state following movement of the associated storage member away from a neighbouring storage member, and the time when the drive switch means is operated.

5. An assembly as claimed in claim 4 in which each control circuit comprises a first series circuit including a selector switch which is closed when operated by the central programmer, a sensor switch which is closed when not operated by the associated feeler bar, and a timer; and a second series circuit including a switch contact operated by the timer and a drive switch means, this second series circuit being connected in parallel with the sensor switch and timer.

6. An assembly as claimed in claim 5 in which each drive switch means is a relay and is made self-holding by a switch contact thereof which is connected across the switch contact of the timer so that the latter is bypassed once it operates to energise the relay.

7. An assembly as claimed in claim 5 in which the drive switch means in said second series circuit of each pair of control circuit associated with the same storage member controls a switch contact in the other so that operation of the two drive switch means are interlocked in a mutually exclusive manner.

8. An assembly as claimed in claim 5 in which each sensor switch is a double pole switch having a first switch contact which is connected in said first series circuit with the timer, and a second switch contact which always assumes the opposite state to said first switch contact and is connected in a third series circuit which includes stop means and which is connected in parallel with said first switch contact and the timer, said first series circuit further including a switch contact which is controlled by said stop means and which opens to make the drive switch means inoperative when the stop means is operated by closure of said second switch contact.

9. An assembly as claimed in claim 1 in which each sensor switch is a double pole switch having a first switch contact which, when the sensor switch is not operated, operates the drive switch means, a second switch contact which, when the sensor switch is operated, operates stop means which in turn makes the drive switch means inoperative.

10. An assembly as claimed in claim 9 which includes a start switch which controls operation of all said control circuits and which must be operated to initiate movement of the storage members, and in which each stop means is connected in a self-holding circuit which includes a switch controlled by the stop means and switch means which is ganged with the start switch so that the stop means remains operated until the start switch is operated.

11. An assembly as claimed in claim 1 which includes a start switch which controls operation of all said control circuits and which must be operated to initiate movement of the storage members.

12. An assembly as claimed in claim 11 in which the start switch is connected in a start circuit with a timer which after the start switch is operated operates for a predetermined time corresponding to a complete gangway selection operation and which at the end of this time disconnects power from the control circuits.

13. An assembly as claimed in claim 12 in which the start switch controls energisation of a start relay which has a switch contact connected in the power supply line to the control circuits, and the timer operates to de-energise the start relay after said predetermined time.

14. An assembly as claimed in claim 11 in which the start switch is connected in a start circuit with a self-holding start relay and controls energisation of this relay, and in which a selector switch is connected in the start circuit and operates to de-energise the start relay each time the manually operable means of the central programmer is operated to make a gangway selection.

* * * * *